United States Patent
Foroozanfard et al.

(10) Patent No.: US 12,332,371 B2
(45) Date of Patent: Jun. 17, 2025

(54) ELECTRONIC RADAR DEVICE (71) Applicant: Acconeer AB, Malmö (SE)

(72) Inventors: Ehsan Foroozanfard, Malmö (SE); Mikael Egard, Malmö (SE)

(73) Assignee: Acconeer AB, Malmö (SE)

( * ) Notice: Subject to any disclaimer, the term of this patent is extended or adjusted under 35 U.S.C. 154(b) by 384 days.

(21) Appl. No.: 18/001,221

(22) PCT Filed: Jun. 8, 2021

(86) PCT No.: PCT/EP2021/065324
§ 371 (c)(1),
(2) Date: Dec. 8, 2022

(87) PCT Pub. No.: WO2021/250016
PCT Pub. Date: Dec. 16, 2021

(65) Prior Publication Data
US 2023/0228843 A1 Jul. 20, 2023

(30) Foreign Application Priority Data
Jun. 9, 2020 (EP) .................................... 20178985

(51) Int. Cl.
*G01S 7/03* (2006.01)
*G01S 7/02* (2006.01)
(Continued)

(52) U.S. Cl.
CPC .............. *G01S 7/032* (2013.01); *G01S 7/028* (2021.05); *G01S 7/06* (2013.01); *H01Q 1/24* (2013.01);
(Continued)

(58) Field of Classification Search
CPC . G01S 7/032; G01S 7/028; G01S 7/06; G01S 13/88; H01Q 1/24; H01Q 1/38; H01Q 15/08; H01Q 1/243
See application file for complete search history.

(56) References Cited

U.S. PATENT DOCUMENTS 10,084,490 B2  9/2018  Ouyang et al.
10,103,424 B2  10/2018  Noori et al.
(Continued)

FOREIGN PATENT DOCUMENTS

CN   112805878 A  *  5/2021
EP   2 34 328 A1    3/2009
JP   2021006799 A  *  1/2021

OTHER PUBLICATIONS

18001221_2025-02-07_CN_112805878_A_M.pdf, machine translation of CN-112805878-A (Year: 2021).*
(Continued)

*Primary Examiner* — Timothy A Brainard
*Assistant Examiner* — Kenneth W Good
(74) *Attorney, Agent, or Firm* — Christensen O'Connor Johnson Kindness PLLC (57) ABSTRACT

A radar device comprising: a printed circuit board (120), PCB, comprising a ground plane (1202), a radar sensor chip package (130) mounted on the PCB (120) and comprising a mmWave radio frequency, RF, integrated circuit (1302) and a planar antenna structure (1304) configured as an antenna-in-package and oriented in a plane parallel to the ground plane (1202), wherein the mmWave RF integrated circuit (1302) is configured to output a mmWave signal (1360) to be transmitted by the planar antenna structure (1304), and a cavity (140), wherein the radar sensor chip package (130) is arranged in the cavity (140), the cavity (140) having an open side (1402), and the cavity (140) being defined by a conductive rear wall surface (1404) opposite the open side
(Continued)

(1402), a pair of mutually opposite and conductive sidewall surfaces (1406), a conductive top surface (1408), and a conductive bottom surface (1410), wherein at least a portion of the conductive bottom surface (1410) is formed by at least a portion of the ground plane (1202) of the PCB (120), and wherein the sidewall surfaces, the top surface, and the bottom surfaces (1406, 1408, 1410) each extends from the rear wall surface (1404) towards the open side (1402) of the cavity (140).

14 Claims, 3 Drawing Sheets

(51) Int. Cl.
  *G01S 7/06* (2006.01)
  *G01S 13/88* (2006.01)
  *H01Q 1/24* (2006.01)
  *H01Q 1/38* (2006.01)
  *H01Q 15/08* (2006.01)

(52) U.S. Cl.
  CPC ............... *H01Q 1/38* (2013.01); *H01Q 15/08* (2013.01); *G01S 13/88* (2013.01)

(56) References Cited

U.S. PATENT DOCUMENTS

| | | | |
|---|---|---|---|
| 10,541,474 B2 | 1/2020 | Arfaei Malekzadeh et al. | |
| 2009/0207080 A1* | 8/2009 | Floyd | H01Q 1/2283 343/700 MS |
| 2015/0070228 A1 | 3/2015 | Gu et al. | |
| 2015/0364830 A1* | 12/2015 | Tong | H10F 71/00 342/27 |
| 2018/0372844 A1 | 12/2018 | Jungmaier et al. | |
| 2021/0359419 A1* | 11/2021 | Chayat | H01Q 9/30 |
| 2024/0072419 A1* | 2/2024 | Dalmia | H01L 23/58 |

OTHER PUBLICATIONS

18001221_2025-02-07_JP_2021006799_A_M.pdf, machine translation of JP-2021006799-A (Year: 2021).*

He, Y., and K. Ma, "A Cavity-Backed End-Fire Dipole Antenna Using SISL Technology for 24 GHz Automotive Anti-Collision Radar System," 2018 IEEE MTT-S International Wireless Symposium (IWS), IEEE, May 6, 2018, pp. 1-4.

Jensen, E., "Cavity Basics," Proceedings, CAS—CERN Accelerator School: RF for Accelerators, Ebeltoft, Denmark, Jun. 8-17, 2010, pp. 259-275.

International Search Report and Written Opinion mailed Sep. 24, 2021, issued in corresponding International Application No. PCT/EP2021/065324, filed Jun. 8, 2021, 9 pages.

* cited by examiner

ELECTRONIC RADAR DEVICE

TECHNICAL FIELD

The present invention relates to a radar device and an electronic device comprising a radar device.

BACKGROUND OF THE INVENTION

There are a wide range of applications in which the distances to or presence of objects are used. Examples of applications in which the distance to, or presence of, objects may be useful to determine are automatic doors, signalized pedestrian crossings, various types of dispensing units (e.g., soap dispensers), and interactions with computers or mobile phones, to name a few.

Ultrasonic sensor and optical sensors are commonly used for such applications. However, they are often very sensitive to non-ideal surrounding, such as noise, dirt present on the sensors, ambient light and sound levels, etc. Radar sensors, on the other hand, are typically less sensitive to such things and can therefore provide more reliable distance/presence measurements in many circumstances. For the above-mentioned applications, mmWave-based radar sensors may be of particular interest.

Radar sensor chip packages lend themselves for cost-efficient and compact integration of radar sensors in electronic devices of various form factors. A radar sensor chip package may comprise an RF integrated circuit and a planar antenna structure configured as an antenna-in-package. The radar sensor chip package may be mounted on a printed circuit board (PCB) in order to integrate the radar functionality with the other functions of the electronic device. A PCB typically comprises a ground plane, and in presence of an underlying ground plane, planar antenna structures tend to present a predominantly broad-side transmission pattern. In many electronic devices, however, an end-fire transmission pattern is desirable. As one example, in portable electronic devices such as mobile phones the broad-side direction may be blocked by a display, unless holes or notches are provided for.

Thus, there exists a need for a solution allowing electronic devices to provide efficient end-fire radiation.

SUMMARY OF THE INVENTION

It is an object of the present inventive concept to provide an electronic device with an improved implementation of a radar sensor.

According to a first aspect a radar device is provided. The radar device comprising: a printed circuit board, PCB, comprising a ground plane, a radar sensor chip package mounted on the PCB and comprising a mmWave radio frequency, RF, integrated circuit and a planar antenna structure configured as an antenna-in-package and oriented in a plane parallel to the ground plane, wherein the mmWave RF integrated circuit is configured to output a mmWave signal to be transmitted by the planar antenna structure, and a cavity, wherein the radar sensor chip package is arranged in the cavity, the cavity having an open side, and the cavity being defined by a conductive rear wall surface opposite the open side, a pair of mutually opposite and conductive sidewall surfaces, a conductive top surface, and a conductive bottom surface, wherein at least a portion of the conductive bottom surface is formed by at least a portion of the ground plane of the PCB, and wherein the sidewall surfaces, the top surface, and the bottom surfaces each extends from the rear wall surface towards the open side of the cavity, wherein a width dimension and a height dimension of the cavity are such that a mmWave signal output by the mmWave RF integrated circuit and transmitted by the planar antenna structure excites at least one resonant mode of the cavity.

Thereby, the mmWave signal output by the mmWave RF integrated circuit may be transmitted through the open side of the cavity. In other words, mmWave signals may be transmitted in an end-fire direction. The term "end-fire" is hereby used to denote a direction parallel to the plane of the planar antenna structure (which is parallel to the ground plane). Conversely, the term "broad-side" is herein used to denote a direction normal to the plane of the planar antenna structure.

As discussed above, in presence of an underlying ground plane, planar antenna structures, tend to present a predominantly broad-side transmission pattern. This typically applies also to end-fire antennas. At least, presence of a ground plane below end-fire antennas tend to lead to a reduction of the efficiency in the end-fire direction. For example, this may be addressed by removing portions of the ground plane underneath the planar antenna structure, or the planar antenna structure may be disposed outside a periphery of the ground plane. Such modifications may however be undesired modifications from the view-point of an electronic device incorporating the radar device. It may, e.g. affect the functionality and/or the hardware design of the electronic device, and or result in a less compact design.

By the inventive combination of the radar sensor chip package and the cavity, an end-fire radiation pattern may be obtained despite presence of the ground plane, and thus without requiring modifications of e.g. the ground plane or the layout of the PCB. More specifically, an end-fire radiation pattern may be achieved using a planar antenna-in-package configuration, which enables a compact solution with a comparably low profile height. As may be appreciated, this may be especially advantageous in portable electronic devices with a thin form factor such as mobile phones, tablet computers, laptop computers, media players, or smart watches.

By "mmWave signal" herein is meant electromagnetic radiation having a wavelength within the millimeter waveband. The millimeter waveband may correspond to a frequency of the electromagnetic radiation from 30 GHz to 300 GHz.

In addition to transmit a mmWave signal, the radar sensor chip package may be configured to receive a (reflected transmitted) mmWave signal via the planar antenna structure. Analogous to the above discussion, a high reception efficiency in the end-fire direction may be obtained owing to the cavity.

The conductive bottom surface of the cavity may be formed by at least a portion of the ground plane of the PCB. In other words, the entire conductive bottom surface of the cavity may be formed by at least a portion of the ground plane of the PCB.

Thereby, the cavity may be formed without introducing an additional, separate layer acting as bottom surface. Hence, by avoiding additional components, an overall thickness and/or complexity of the radar device may be reduced.

The cavity may be filled with a dielectric.

By filling the cavity with a dielectric, a physical dimension (e.g., width, thickness, and/or depth) of the cavity may be varied to a larger extent since the at least one resonant mode to be excited by the emitted mmWave signal may depend on a refractive index of the dielectric in the cavity. In other words, filling the cavity with a dielectric provides a further adjustable variable (i.e. the refractive index of the dielectric) when designing the cavity. It is further appreciated that a structural integrity of the radar device may be improved by filling the cavity with a solid dielectric as compared to a radar device comprising a cavity not being filled with a solid dielectric.

The cavity may present an outward tapering at the open side.

An associated advantage is that the outward tapering at the open side may act as an impedance transformer configured to match an impedance of the combined antenna system formed by the cavity and the radar sensor chip package with an impedance of free space (i.e. surroundings of the radar device). By matching the impedance losses associated with receiving reflections of a mmWave signal emitted through the dielectric window may be reduced, thereby improving a performance of the radar device.

The radar device may further comprise a dielectric lens arranged at the open side of the cavity.

The dielectric lens may be configured to collimate a mmWave signal emitted through the dielectric window and/or to focus a received reflection of the emitted mmWave signal toward the radar sensor chip package, thereby increasing the performance (e.g. a gain) of the radar device.

The planar antenna structure may comprise a transmitting antenna configured to transmit the mmWave signal and a receiving antenna configured to receive reflections of the transmitted mmWave signal.

In other words, the radar sensor chip package may be configured to transmit and receive a mmWave signal via a respective (dedicated) transmitting and receiving antenna. Alternatively, the planar antenna structure may comprise a (combined) transmit/receive antenna configured to both transmit and receive the mmWave signals. In both cases, mmWave signals may be transmitted and received by a single chip package, thereby reducing a number of components (i.e. radar sensor chip packages) needed to transmit and receive mmWave signals. Thus, by reducing a number of components, a complexity of the radar device may be reduced. It is further appreciated that by reducing the number of components of the radar device, an assembly and/or construction of the radar device may be simplified.

The transmitting antenna and the receiving antenna may be arranged side-by-side as seen along a length dimension of the cavity. The transmitting and the receiving antenna may further be arranged symmetrically with respect to a longitudinal central axis of the cavity.

The width dimension and the height dimension of the cavity, in terms of radio path length for the mmWave signal, may be within a range from 3 to 40 mm and within a range from 1 to 15 mm, respectively.

By "radio path length" herein is generally meant a product of a physical distance that the emitted mmWave propagates through a material and a refractive index of the material for the frequency of the emitted mmWave signal. Hence, radio path length corresponds to the concept of "optical path length".

Said PCB may form a first PCB and wherein the radar sensor chip package may further comprise a second PCB having a first side facing the first PCB and an opposite second side, wherein the mmWave RF integrated circuit may be mounted on the first side of the second PCB and the planar antenna structure may be formed on the second side of the second PCB.

By arranging the mmWave RF integrated circuit and the planar antenna structure on opposite sides of the second PCB, the mmWave RF integrated circuit may at least to some extent be shielded from EMC disturbance from the cavity.

The second PCB may further comprise a ground plane between the first and second sides of the second PCB.

Hence, the mmWave RF integrated circuit and the planar antenna structure may be arranged on opposite sides of the ground plane of the second PCB, whereby the mmWave RF integrated circuit may be shielded from a mmWave signal transmitted by the planar antenna structure. Hence, interference between the mmWave RF integrated circuit and the planar antenna structure may be further reduced.

According to a second aspect an electronic device is provided. The electronic device comprising: a housing, a dielectric window arranged in an outer side wall portion of the housing, a display arranged in the housing and forming a front side of the electronic device, and a radar device according to the first aspect, wherein the PCB is arranged in the housing and the ground plane of the PCB is parallel to the display, and wherein the cavity is arranged in the housing with the open side facing the dielectric window.

Hence, the mmWave signal may be transmitted through a side wall portion of the housing, which may allow for interactions (via the transmitted mmWave signal) with the electronic device at a side wall of the electronic device. The above-mentioned features of the first aspect, when applicable, apply to this second aspect as well. In order to avoid undue repetition, reference is made to the above.

The top surface of the cavity may be formed by a portion of a conductive surface of the display.

Since the electronic device may comprise a display, the top surface of the cavity may be formed without introducing an additional, separate layer acting as the top surface. Hence, by avoiding additional components, an overall thickness and/or complexity of the electronic device may be reduced. It is further appreciated that a construction and/or an assembly of the electronic device may be simplified by avoiding the introduction of a separate layer/component acting as the top surface of the cavity.

The housing may comprise two inwardly protruding sidewall portions on opposite sides of the dielectric window and a rear wall portion connecting the two sidewall portions, wherein the sidewall surfaces of the cavity may be surfaces of the two sidewall portions of the housing, and the rear wall surface of the cavity may be a surface of the rear wall portion of the housing.

In other words, the two sidewall surfaces and the rear wall surface of the cavity may be portions of the housing (e.g. integrally formed therewith), thereby allowing the cavity to be formed without introducing additional, separate components acting as the two sidewall surfaces and the rear wall surface. Hence, by avoiding additional components, a complexity of the electronic device may be reduced. It is further appreciated that a construction and/or an assembly of the electronic device may be simplified by avoiding the introduction of separate components acting as the two sidewalls surfaces and the rear wall surface of the cavity.

The electronic device may be a mobile phone, a tablet computer, a laptop computer, a media player, or a smart watch.

These types of electronic devices typically comprise a PCB and other conductive surfaces and may therefore benefit from a radar implementation according to the present inventive concept.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present inventive concept will now be described in more detail, with reference to appended drawings showing variants of the invention. The figures should not be considered limiting the invention to the specific variant; instead they are used for explaining and understanding the inventive concept. As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

Figure 1A:
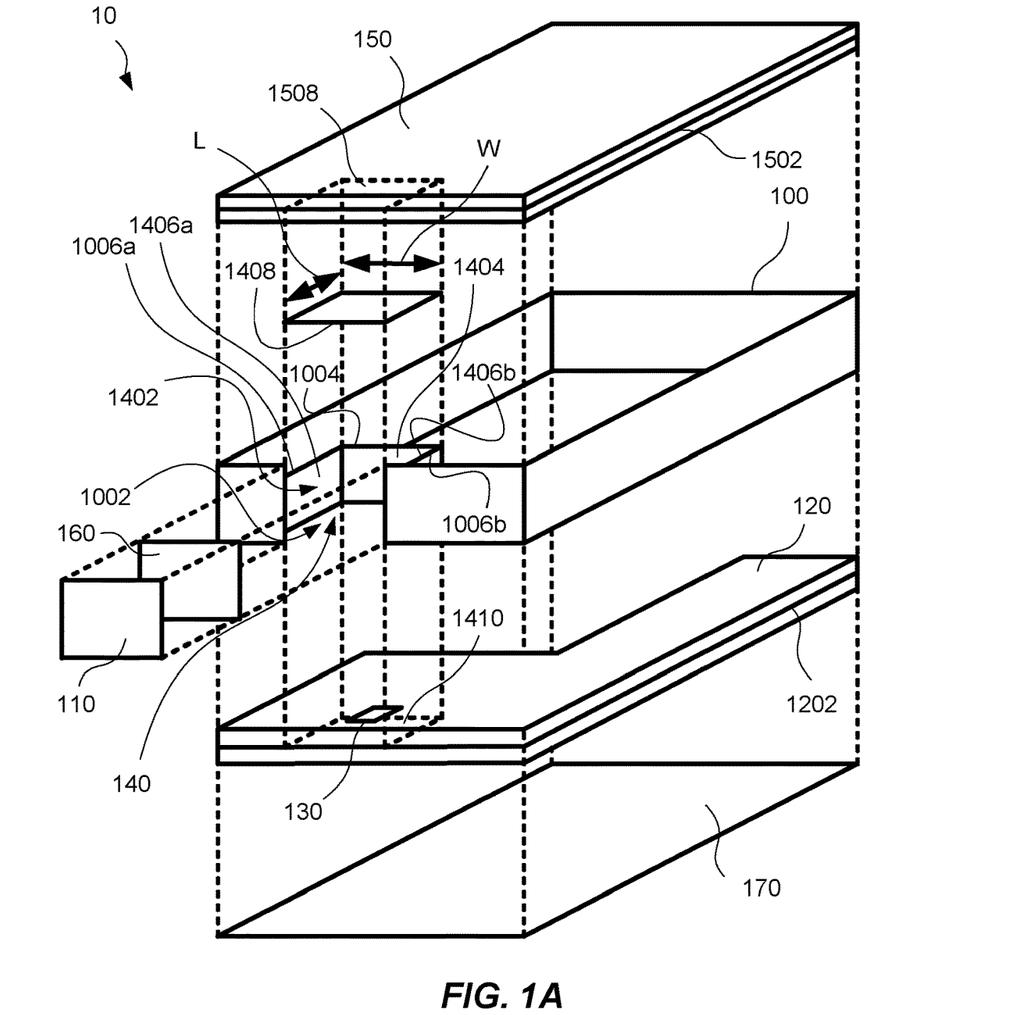
FIG. 1A illustrates an exploded view of an electronic device.

FIG. 1A illustrates an exploded view of an electronic device 10. The electronic device 10 comprises a housing 100, a dielectric window 110, a printed circuit board (PCB) 120, and a radar sensor chip package 130. The electronic device may further comprise a power source (not shown), e.g., an internal battery. As is illustrated in FIG. 1A, the electronic device 10 may further comprise a back cover 170. Even though not explicitly shown in FIG. 1A, the housing 100 may comprise additional structural features. The structural features may increase a structural integrity of the electronic device 10 and/or provide sites used for attaching internal components (e.g. the PCB 120 etc.) to the housing 100. In FIG. 1A, the electronic device 10 is depicted in the form factor of a mobile phone. However, the radar device is equally applicable to other types of portable electronic devices, e.g., a tablet computer, a laptop computer, a media player, or a smart watch. These types of portable electronic devices typically comprise a PCB 120 and other conductive surfaces and may therefore benefit from a radar device as described herein. Further, the radar device is not limited for use in specifically portable electronic devices but may also be implemented in devices such as automatic doors, signalized pedestrian crossings, various types of dispensing units (e.g., soap dispensers), and computers. Common to all use cases is that the radar device may allow contactless detection of and/or distance measurements to objects (e.g., a hand) in proximity to the device. With reference to FIG. 1A, the dielectric window 110 is arranged in an outer wall portion 1002 of the housing 100, for example an outer side wall portion of the housing. The dielectric window 110 may comprise a plastic material and/or glass.

The PCB 120 is arranged in the housing 100. The PCB 120 comprises a ground plane 1202. The PCB 120 may comprise circuitry logic of the electronic device 10. The PCB 120 may hold application specific integrated circuits (ASICs). The circuitry logic of the PCB 120 may comprise a processing unit (not shown) and/or a non-transitory computer-readable storage medium (not shown). The circuitry logic may be configured to control one or more functions of the electronic device 10. The circuitry logic may be configured to control one or more functions related to the radar sensor chip package 130. The ground plane 1202 of the PCB 120 may be coextensive with the PCB 120.

Figure 2A:
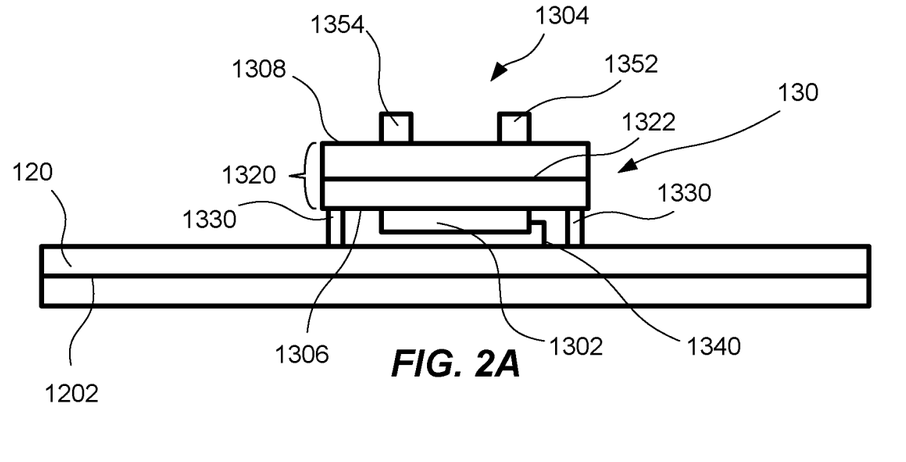
FIG. 2A illustrates a side view of a radar sensor chip package and a PCB.

The radar sensor chip package 130 is mounted on the PCB 120. The radar sensor chip package 130 may be connected to the circuitry logic of the PCB 120. As is shown in the example of FIG. 2A, the radar sensor chip package 130 comprises a mmWave radio frequency (RF) integrated circuit 1302 and a planar antenna structure 1304 configured as an antenna-in-package and oriented in a plane parallel to the ground plane 1202. The planar antenna structure 1304 may be directly integrated into the radar sensor chip package 130 along with the radio frequency integrated circuit 1302. The ground plane 1202 of the PCB 120 may extend underneath the planar antenna structure 1304. The ground plane 1202 may comprise a metal, e.g. copper.

The mmWave RF integrated circuit 1302 is configured to output a mmWave signal to be transmitted by the planar antenna structure 1304. The planar antenna structure 1304 may comprise one or more of a patch antenna, a folded dipole antenna, a monopole antenna, a slot antenna, and a dipole antenna. The transmitted mmWave signal may be transmitted as a continuous wave and/or as a pulse/wavelet. A (carrier) frequency of the mmWave signal may lie in the millimeter wave band. The mmWave RF integrated circuit 1302 may as one example be configured to generate the mmWave signal(s) within a band of 57 to 71 GHz. Various techniques for generating continuous wave or pulsed mmWave signals exist. Continuous wave mmWave signals may be generated e.g. using voltage-controlled mmWave oscillators. Pulsed mmWave signals may be generated e.g.

by passing a continuous oscillation through a switchable amplifier, filtering of a baseband pulse, up-conversion of a baseband pulse, or using digital gates to create the desired waveform. Another example is a transceiver module, as described in connection with FIG. 4 of the published PCT-application PCT/EP2011/058847 on page 11 lines 22-30. A further example oscillator configuration may rely on negative differential conductance (e.g. provided by a cross-coupled differential pair) or positive feedback, where it is possible to start and quench the oscillations rapidly. By the afore-mentioned techniques, it is possible to generate pulses with, e.g., a temporal extension/duration in the range of 50 ps to 100 ns.

The radar sensor chip package 130 is arranged in a cavity 140 of the housing 100. The cavity 140 has an open side 1402 facing the dielectric window 110. The cavity 140 is defined by a conductive rear wall surface 1404 opposite the open side, a pair of mutually opposite and conductive sidewall surfaces 1406, a conductive top surface 1408, and a conductive bottom surface 1410. The conductive bottom surface 1410 may, as shown in FIG. 1A, be formed by a portion of the ground plane 1202 of the PCB 120. The conductive bottom surface 1410 may, alternatively, be formed by a combination of the ground plane 1202 of the PCB 120 and an additional conductive surface such as a metal sheet, i.e. a surface area of the PCB 120 may be smaller than a (total) surface area of the conductive bottom surface 1410 of the cavity 140. The rear wall surface 1404, the sidewall surfaces 1406, and the top surface 1408 may be metal surfaces, e.g. of copper, aluminum, magnesium, or alloys thereof. A position of the radar sensor chip package 130, and hence the planar antenna structure 1304, in the cavity 140 may be adapted for impedance matching of antennas of the planar antenna structure 1304. As will be further described below, the cavity 140 may cause the mmWave signals to be transmitted through the dielectric window 110 in an end-fire direction (i.e. parallel to the ground plane 1202 of the PCB 120).

The sidewall, the top, and the bottom surfaces 1406, 1408, 1410, each extends from the rear wall surface 1404 towards the open side 1402 of the cavity 140.

As shown in the example of FIG. 1A, the housing 100 may comprise two inwardly protruding sidewall portions 1006 on opposite sides of the dielectric window 110 and a rear wall portion 1004 connecting the two sidewall portions 1006. The sidewall surfaces 1406 of the cavity 140 may be surfaces of the two sidewall portions 1006 of the housing 100. The rear wall surface 1404 of the cavity may be a surface of the rear wall portion 1004 of the housing 100. In other words, the two sidewall surfaces 1406 and/or the rear wall surface 1404 of the cavity 140 may be portions of the housing 100. The cavity 140 may thereby be formed without introducing additional, separate components acting as the rear wall surface 1404 and/or the two sidewall surfaces 1406. The cavity 140 in FIG. 1A is shown as having a shape similar to a rectangular box, however, it is to be understood that the shape of the cavity 140 may be different. For example, one or more of the sidewall surfaces defining the cavity 140 may have a curvature.

A width dimension W and a height dimension H (see FIG. 3B) of the cavity 140 are such that a mmWave signal output by the mmWave RF integrated circuit 1302 and transmitted by the planar antenna structure 1304 excites at least one resonant mode of the cavity 140. The width dimension W of the cavity 140 is defined by a separation between the two sidewall surfaces 1406 of the cavity 140. The height dimension H of the cavity 140 is defined by a separation between the top surface 1408 and the bottom surface 1410 of the cavity 140 (i.e. the portion of the ground plane 1202 of the PCB 120). A length dimension L of the cavity 140 may be defined by a separation between the open side 1402 and the rear wall surface 1404 of the cavity 140. The length dimension L of the cavity 140 may be such that an impedance of the cavity 140 is matched to an impedance of the surroundings of the electronic device 10. Through the excitation of at least one resonant mode of the cavity 140, the mmWave signal transmitted by the planar antenna structure 1304 is emitted through the dielectric window 110. Hence, the mmWave signals may be transmitted in an end-fire direction.

One or more of the two sidewall surfaces 1406, the top surface 1408 and the bottom surface 1410 of the cavity 140 may comprise protrusions (not shown). A protrusion may, e.g., be a screw and/or a rivet. One or more of a position inside the cavity, a size, and a material of the protrusions may be adapted to further match the impedance of the cavity 140 to the impedance of the surroundings of the electronic device 10.

The cavity 140 may be filled with a dielectric (not shown). The dielectric may comprise a plastic material. By filling the cavity 140 with a dielectric, a physical dimension (e.g., the width W, the height H, and/or the length L) of the cavity 140 may be varied to a larger extent since the at least one resonant mode to be excited by the emitted mmWave signal may depend on a refractive index of the dielectric in the cavity 140. For example, one or more of the width W, the height H, and the length L of the cavity 140 may be decreased in case the cavity 140 is filled with a dielectric. It is further appreciated that a structural integrity of the electronic device 10 may be improved by filling the cavity 140 with a solid dielectric as compared to an electronic device 10 comprising a cavity 140 not being filled with a solid dielectric.

The width dimension W and the height dimension H of the cavity 140, in terms of radio path length for the mmWave signal, may be within a range from 3 to 40 mm and within a range from 1 to 15 mm, respectively. The width dimension W and the height dimension H of the cavity 140 may be adapted to the frequency of the mmWave signal transmitted by the planar antenna structure 1304 such that the mmWave signal may excite one or more resonant modes of the cavity. For example, for a frequency within a range from 57-81 GHz, the radio path lengths of the width dimension W may be within a range from 7.5-15 mm and the radio path lengths of the height dimension H may be within a range from 1.5-5 mm. For a frequency within a frequency band of 57-64 GHZ, the radio path lengths of the width dimension W may be within a range from 10-15 mm and the radio path lengths of the height dimension H may be within a range from 2.5-5 mm. For a frequency about 120 GHz, the radio path lengths of the width dimension W may be within a range from 5-8 mm and the radio path lengths of the height dimension H may be within a range from 1-3 mm. For a frequency within a frequency band of 77-81 GHZ, the radio path lengths of the width dimension W may be within a range from 7.5-12 mm and the radio path lengths of the height dimension H may be within a range from 1.5-4 mm.

As shown in the example of FIG. 1A, the electronic device 10 may further comprise a display 150. The display 150 may be an LCD, LED or OLED display. The display 150 may be connected to the PCB 120 and/or the power source (not shown). The display 150 may be connected to circuitry logic of the PCB 120. The display 150 may be a touchsensitive display. The display 150 may be substantially coextensive with the front side 12 of the electronic device 10.

The display 150 may be arranged in the housing 100 and may form the front side 12 of the electronic device 10. The ground plane 1202 of the PCB 120 may be parallel to the display 150. More specifically, the ground plane 1202 of the PCB 120 may be parallel to a conductive surface 1502 of the display 150.

As is shown in the example of FIG. 1A, the dielectric window 110 may be arranged in an outer side wall portion 1002 of the housing 100. The top surface 1408 of the cavity 140 may be formed by a portion 1508 of a conductive surface 1502 of the display 150. The conductive surface 1502 may be an internal surface of the display 150. In case the electronic device 10 comprises a display 150, the top surface 1408 of the cavity 140 may be formed without introducing an additional, separate layer acting as the top surface 1408. Hence, by avoiding additional components, an overall thickness and/or complexity of the electronic device 10 may be reduced.

As is shown in the example of FIG. 1A, the electronic device 10 may further comprise a dielectric lens 160 arranged at the open side 1402 of the cavity 140. As is shown in FIG. 1A, the dielectric lens 160 may be a shaped as a rectangle, however it is to be understood that the shape of the dielectric lens 160 may be different. For example, the shape of the dielectric lens 160 may be elliptical. The dielectric lens 160 may comprise a plastic material, e.g., polycarbonite, acrylonitrile butadiene styrene, polyamide, or polypropylene with dielectric constant (Dk) values <3. The dielectric lens 160 and the dielectric window 110 may be integrally formed. The dielectric lens 160 may be a spherical lens or a Fresnel lens. The dielectric lens 160 may have a diameter within a range from 10 mm to 30 mm. The dielectric lens 160 may have a height within a range from 5 mm to 20 mm. The dielectric lens 160 may be arranged between the dielectric window 110 and the cavity 140. The dielectric lens 160 may be configured to collimate a mmWave signal to be emitted through the dielectric window 110 and/or to focus a received reflection of an emitted mmWave signal toward the radar sensor chip package 130, thereby increasing the performance (e.g. a range and/or a gain) of the radar sensor chip package 130.

Figure 1B:
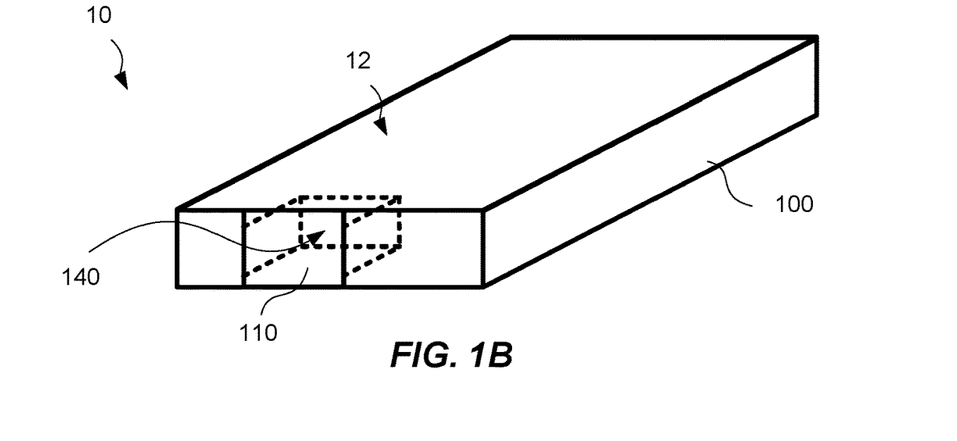
FIG. 1B illustrates the electronic device of FIG. 1A in an assembled state.

FIG. 1B illustrates the electronic device 10 of FIG. 1A in its assembled state. The electronic device 10 may be held together by one or more of screws, rivets, and adhesives. As is shown in the example of FIG. 1B, the housing 100 of the assembled electronic device may form an outer housing (i.e. chassis or enclosure) of the electronic device 10. It is to be understood that the housing 100 further may comprise an internal structure, comprising sidewalls of the cavity 140 and optionally supporting structures and partitions, e.g. not directly visible from an outside of the electronic device 10. The dielectric window 110 is arranged to be in communication with the cavity 140 of the electronic device 10 and the surroundings of the electronic device 10.

The PCB 120 may form a first PCB 120, and as is shown in FIG. 2A, the radar sensor chip package 130 may further comprise a second PCB 1320 having a first side 1306 facing the first PCB 120 and an opposite second side 1308. The mmWave RF integrated circuit 1302 may be mounted on the first side 1306 of the second PCB 1320 and the planar antenna structure 1304 may be formed on the second side 1308 of the second PCB 1320. Since the second side 1308 of the second PCB 1320 may be dedicated to the planar antenna structure 1304, a size of the radar chip package 130 may be reduced. The radar sensor chip package 130 may be mounted on the first PCB 120 via mounts 1330. The mmWave RF integrated circuit 1302 may be connected to the first PCB via an electrical connection 1340. The electrical connection 1340 may be a separate electrical connection as illustrated in the example of FIG. 2A and/or may form a part of one or more of the mounts 1330. The electrical connection 1340 may be configured to connect the mmWave RF integrated circuit 1302 to the circuitry logic of the first PCB 120. The first PCB 120 may comprise a ball grid array (not shown) wherein the radar sensor chip package 130 may be mounted and electrically connected to the first PCB 120 by the ball grid array. Other types of surface mount technology (e.g. by means of pins) is also possible, as well as through-hole mounting.

As is shown in the example of FIG. 2A, the second PCB 1320 may further comprise a ground plane 1322 between the first and second sides 1306, 1308 of the second PCB 1320. Thus, the mmWave RF integrated circuit 1302 and the planar antenna structure 1304 may be arranged on opposite sides 1306, 1308 of the ground plane 1322 of the second PCB 1320. The mmWave RF integrated circuit 1302 may thereby be shielded (by the ground plane 1322 of the second PCB 1320) from EMC disturbance from the cavity 140.

Although not explicitly shown in the figures, the mmWave RF integrated circuit 1302 and the planar antenna structure 1304 may be arranged on the second side 1308 of the second PCB 1320. The mmWave RF integrated circuit 1302 may in such case be shielded from EMC disturbance by additional conducting surfaces (not shown) enclosing the mmWave RF integrated circuit 1302.

The planar antenna structure 1304 may, as shown in the example of FIG. 2A, comprise a transmitting antenna 1352 configured to transmit the mmWave signal and a receiving antenna 1354 configured to receive reflections of the transmitted mmWave signal. In other words, the radar sensor chip package 130 may be configured to transmit and receive a mmWave signal. Hence, mmWave signals may be transmitted and received by a single chip package, thereby reducing a number of components (i.e. radar sensor chip packages) needed to transmit and receive mmWave signals. Thus, by reducing a number of components, a complexity of the electronic device 10 may be reduced. In case the planar antenna structure 1304 comprises a transmitting antenna 1352 and a receiving antenna 1354, the electronic device 10 may be allowed to detect one or more of a presence of, a distance to, an angle to, and a speed of objects (e.g., a finger and/or a hand) in front of the dielectric window 110. Hence, the electronic device 10 may be configured to use mmWave signals transmitted and received by the radar sensor chip package 130 as an additional input, allowing for touchless control of the electronic device 10.

As an alternative to a dedicated transmit antenna 1352 and receiving antenna 1354, the planar antenna structure 1304 may, even though not explicitly shown, comprise a combined transmitting-and-receiving antenna configured to both transmit a mmWave signal and receive reflections of the transmitted mmWave signal.

Figure 2B:
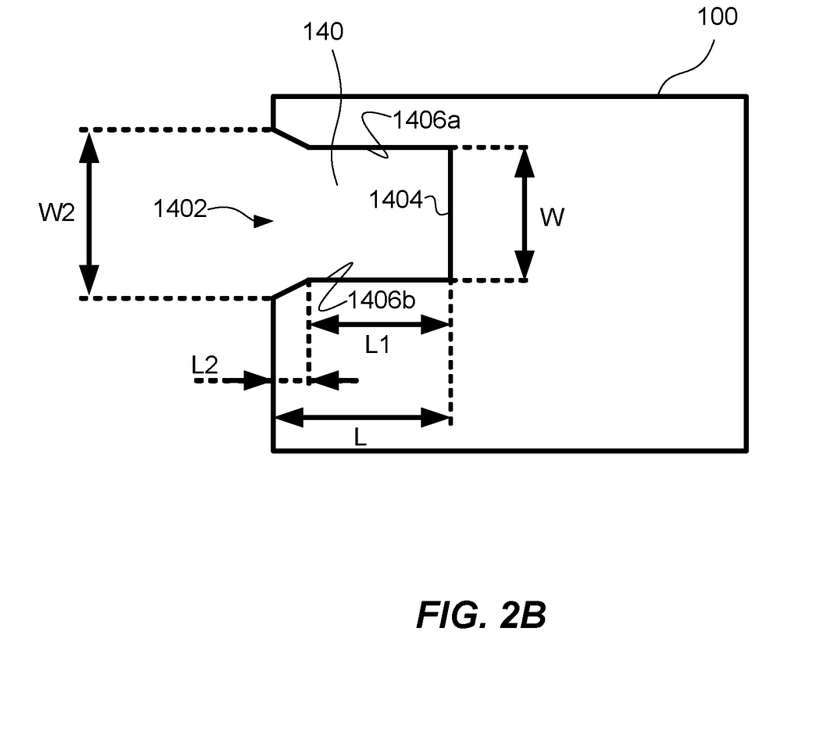
FIG. 2B illustrates a housing comprising a cavity presenting an outward tapering.

As is shown in the example of FIG. 2B, the cavity 140 may present an outward tapering at the open side 1402. In order to increase the readability of FIG. 2B, features (e.g., the dielectric window 110) of the electronic device 10 are not shown. The outward tapering may be presented as an increasing width W of the cavity 140 as seen in a direction from the rear wall surface 1404 toward the open side 1402 of the cavity 140. As is shown in the example of FIG. 2B, the width W of the cavity 140 is the same over a first distance L1, with a tapering (i.e. increasing width W) over a second distance L2. The tapering may present a largest width W2. Alternatively, or additionally, even though not shown in FIG. 2B, the outward tapering may be presented as an increasing height H of the cavity 140 as seen in a direction from the rear wall surface 1404 toward the open side 1402 of the cavity 140.

The outward tapering at the open side 1402 may act as an impedance transformer configured to match an impedance of the combined antenna system formed by the cavity 140 and the radar sensor chip package 130 with an impedance of the surroundings of the electronic device 10. By matching the impedance, losses associated with transmitting/receiving a mmWave signal through the dielectric window 110 may be reduced, thereby improving a performance of the radar sensor chip package 130.

Figure 3A:
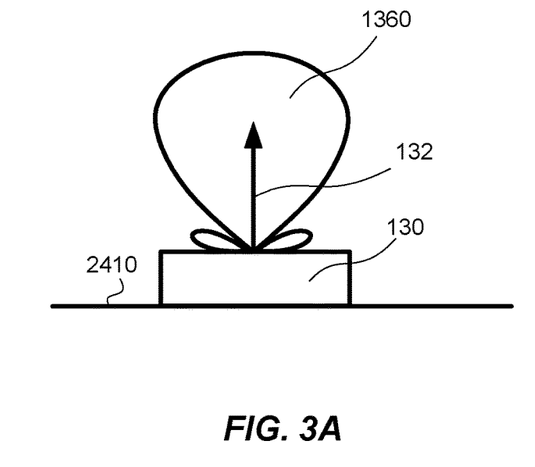
FIG. 3A illustrates a side view of a radar sensor chip package arranged on a conductive surface.

FIG. 3A illustrates a side view of a radar sensor chip package 130 arranged on a conductive surface 2410. In the absence of a cavity 140, the radar sensor chip package 130 in this example emits a mmWave signal 1360 in a direction predominantly parallel to a normal 132 of the radar sensor chip package 130, i.e. in a broad-side direction, as indicated by the lobe 1360 in FIG. 3A.

Figure 3B:
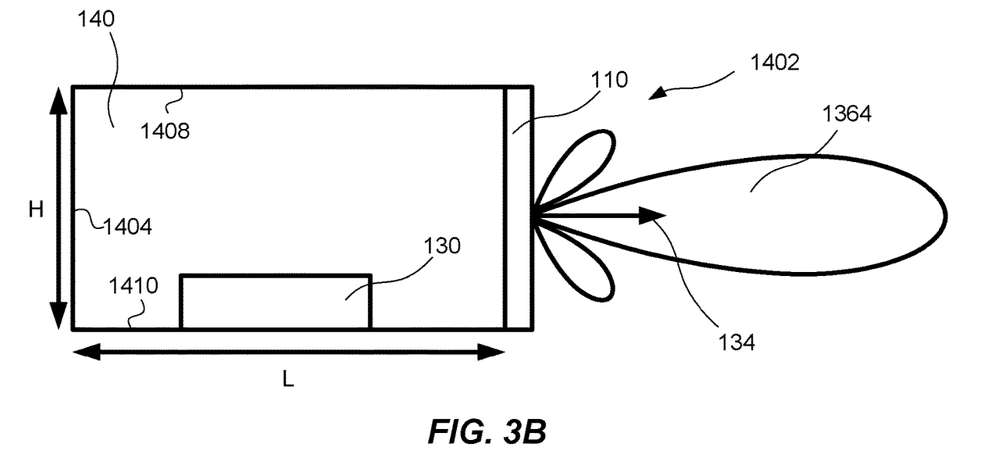
FIG. 3B illustrates a side view of a radar sensor chip package arranged in a cavity.

FIG. 3B illustrates the radar sensor chip package 130 of FIG. 3A positioned inside a cavity 140. Here, the conductive surface 2410 of FIG. 3A is a conductive bottom surface 1410 of the cavity 140. It is to be understood that the conductive bottom surface 1410 illustrated in FIG. 3B may be a ground plane 1202 of a PCB 120. The PCB 120 may be a laminate structure and the ground plane 1202 of the PCB 120 may be an internal layer of the laminate structure. The cavity 140 may support a limited number of modes in the frequency band of interest (i.e. the mmWave band). In this example, the width W of the cavity is 15 mm and the height H of the cavity is 5 mm. A cut-off frequency $F_{cut}$ of the cavity 140 is given by $$F_{cut} = \frac{c}{2\pi\sqrt{\mu_r \epsilon_r}} \sqrt{\left(\frac{m\pi}{H}\right)^2 + \left(\frac{n\pi}{W}\right)^2},$$

where c is the speed of light, $\mu_r$ is a relative permeability of the cavity 140, $\epsilon_r$ is a relative permittivity of the cavity 140, m represents the harmonic modes for the height dimension, and n represents the harmonic modes for the width dimension. The cut-off frequency $F_{cut}$ may be a lowest frequency for which a mode propagates in the cavity 140. Hence, the height dimension H and/or the width dimension W of the cavity 140 may be adapted to the frequency of the mmWave signal transmitted by the radar sensor chip package 130, such that the mmWave signal transmitted by the radar sensor chip package 130 excites one or more resonant modes of the cavity 140. In case the cavity 140 is a rectangular cavity, it can support both transverse electric (TE) and transverse magnetic (TM) modes. For a TE mode to propagate in the cavity 140, either m or n must be larger than or equal to 0. For a TM mode to propagate in the cavity 140, either m or n must be larger than 0. Hence, depending on a frequency of the mmWave signal transmitted by the radar sensor chip package 130, different modes of the cavity 140 will be excited and emitted through the dielectric window 110. It has been found the mode excitation in the cavity 140 may depend on the position of the radar sensor chip package 130 in the cavity 140. For example, it has been found that the position of the radar sensor chip package 130 in the cavity 140 may influence which of the excited modes are dominant. As is shown in FIG. 3B, the combined system of the radar sensor chip package 130 and the cavity 140 emits the mmWave signal in a direction 134 which is predominantly parallel to the conductive bottom surface 1410 of the cavity 140, i.e. in an end-fire direction 134 which is represented by a lobe 1364.

Figure 3C:
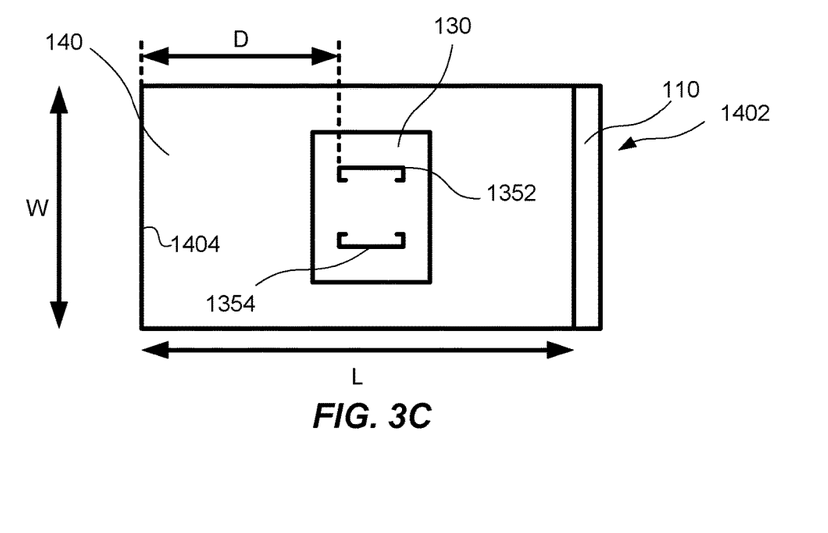
FIG. 3C illustrates a top view of a radar sensor chip package arranged in a cavity such that a receiving antenna and a transmitting antenna of the radar sensor chip package are arranged side-by-side as seen along the length dimension of the cavity.

FIG. 3C illustrates a top-view of the example of FIG. 3B. As is shown in this example, the transmitting antenna 1352 and the receiving antenna 1354 may be arranged side-by-side as seen along a length dimension L of the cavity 140. As is further shown in FIG. 3C, the transmitting antenna 1352 and the receiving antenna 1354 may be arranged at the same distance D from the conductive rear surface 1404 of the cavity 140.

The person skilled in the art realizes that the present inventive concept by no means is limited to the preferred variants described above. On the contrary, many modifications and variations are possible within the scope of the appended claims.

For example, the electronic device 10 in FIG. 1A and FIG. 1B is illustrated as a device resembling a mobile phone, however it is to be understood that the inventive concept may be implemented for other types of electronic devices as well. It may, for example, be implemented in a headphone. The PCB (and therefore the ground plane of the PCB) in a headphone is typically arranged to be parallel to an ear of the user when the headphone is in use. The present inventive concept allows the mmWave signal to be transmitted in a direction parallel to a sagittal plane of the user (e.g., a vertical direction and/or an anterior-posterior direction of the user). The headphone may then be controlled by the detection of reflections of the transmitted mmWave signal.

Additionally, variations to the disclosed variants can be understood and effected by the skilled person in practicing the claimed invention, from a study of the drawings, the disclosure, and the appended claims.

The invention claimed is:

1. A radar device comprising:
a printed circuit board, PCB, comprising a ground plane,
a radar sensor chip package mounted on the PCB and comprising a mmWave radio frequency, RF, integrated circuit and a planar antenna structure configured as an antenna-in-package and oriented in a plane parallel to the ground plane, wherein the mmWave RF integrated circuit is configured to output a mmWave signal to be transmitted by the planar antenna structure, and
a cavity, wherein the radar sensor chip package is arranged in the cavity, the cavity having an open side, and the cavity being defined by a conductive rear wall surface opposite the open side, a pair of mutually opposite and conductive sidewall surfaces, a conductive top surface, and a conductive bottom surface, wherein at least a portion of the conductive bottom surface is formed by at least a portion of the ground plane of the PCB, and wherein the sidewall surfaces, the top surface, and the bottom surfaces each extends from the rear wall surface towards the open side of the cavity,
wherein a width dimension (W) and a height dimension (H) of the cavity are such that a mm Wave signal output by the mm Wave RF integrated circuit and transmitted by the planar antenna structure excites at least one resonant mode of the cavity.

2. A radar device according to claim 1, wherein the conductive bottom surface of the cavity is formed by at least a portion of the ground plane of the PCB.

3. A radar device according to claim 1, wherein the cavity is filled with a dielectric.

4. A radar device according to claim 1, wherein the cavity presents an outward tapering at the open side.

5. A radar device according to claim 1, further comprising a dielectric lens arranged at the open side of the cavity.

6. A radar device according to claim 1, wherein the planar antenna structure comprises a transmitting antenna configured to transmit the mmWave signal and a receiving antenna configured to receive reflections of the transmitted mmWave signal.

7. A radar device according to claim 6, wherein the transmitting antenna and the receiving antenna are arranged side-by-side as seen along a length dimension (L) of the cavity.

8. A radar device according to claim 1, wherein the width dimension (W) and the height dimension (H) of the cavity, in terms of radio path length for the mmWave signal, are within a range from 3 to 40 mm and within a range from 1 to 15 mm, respectively.

9. A radar device according to claim 1, wherein said PCB forms a first PCB and wherein the radar sensor chip package further comprises a second PCB having a first side facing the first PCB and an opposite second side,
wherein the mmWave RF integrated circuit is mounted on the first side of the second PCB and the planar antenna structure is formed on the second side of the second PCB.

10. A radar device according to claim 9, wherein the second PCB further comprises a ground plane between the first and second sides of the second PCB.

11. An electronic device, comprising:
a housing,
a dielectric window arranged in an outer side wall portion of the housing,
a display arranged in the housing and forming a front side of the electronic device, and
a radar device according to claim 1,
wherein the PCB is arranged in the housing and the ground plane of the PCB is parallel to the display, and
wherein the cavity is arranged in the housing with the open side facing the dielectric window.

12. An electronic device according to claim 11, wherein the top surface of the cavity is formed by a portion of a conductive surface of the display.

13. An electronic device according to claim 11, wherein the housing comprises two inwardly protruding sidewall portions on opposite sides of the dielectric window and a rear wall portion connecting the two sidewall portions, wherein the sidewall surfaces of the cavity are surfaces of the two sidewall portions of the housing, and the rear wall surface of the cavity is a surface of the rear wall portion of the housing.

14. An electronic device according to claim 11, wherein the electronic device is a mobile phone, a tablet computer, a laptop computer, a media player, or a smart watch.

* * * * *